Nov. 12, 1940.   R. A. GOEPFRICH   2,221,090
BRAKE
Filed April 4, 1938   4 Sheets-Sheet 1
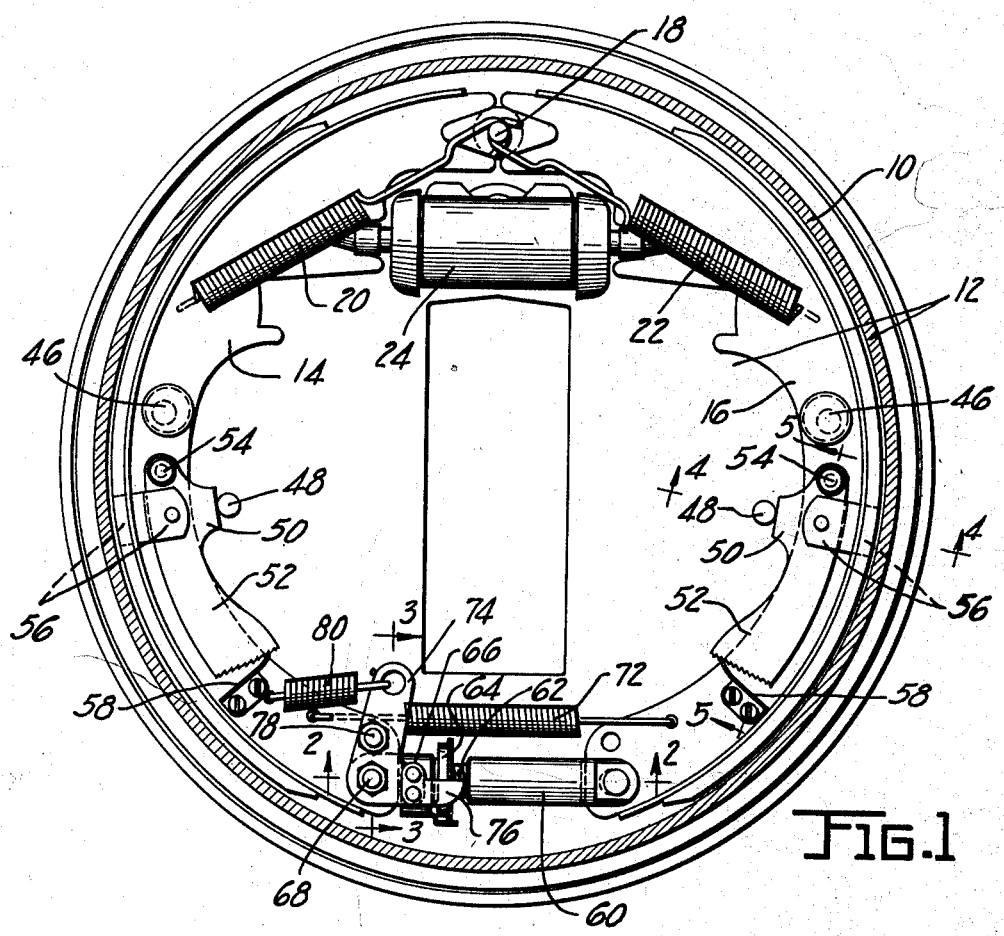
Fig.1
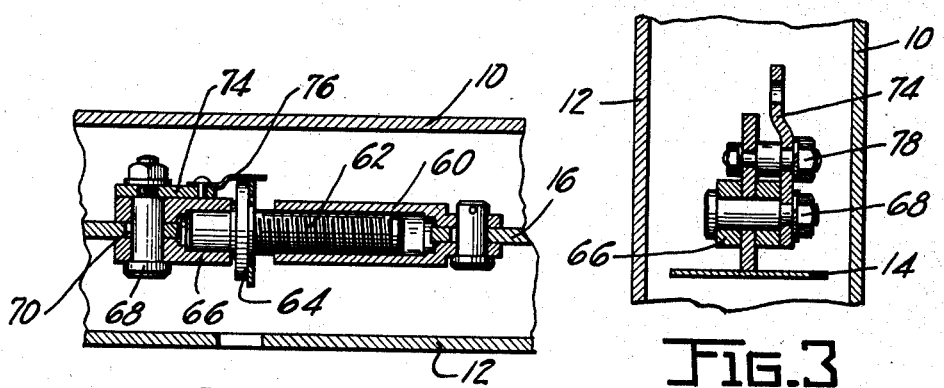
Fig.2
Fig.3
INVENTOR
RUDOLPH A. GOEPFRICH
BY
ATTORNEY Nov. 12, 1940.   R. A. GOEPFRICH   2,221,090
BRAKE
Filed April 4, 1938   4 Sheets-Sheet 2

INVENTOR
RUDOLPH A. GOEPFRICH
BY
ATTORNEY

Nov. 12, 1940.   R. A. GOEPFRICH   2,221,090
BRAKE
Filed April 4, 1938   4 Sheets-Sheet 3

INVENTOR
RUDOLPH A. GOEPFRICH
BY
M. W. McConkey
ATTORNEY

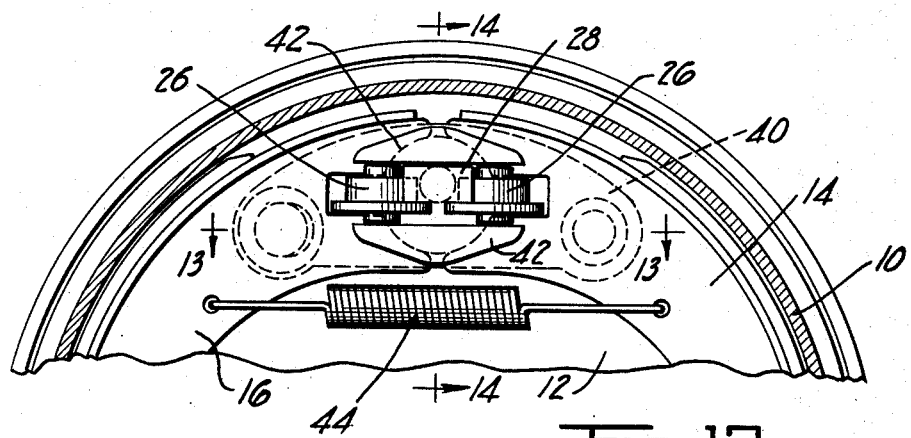
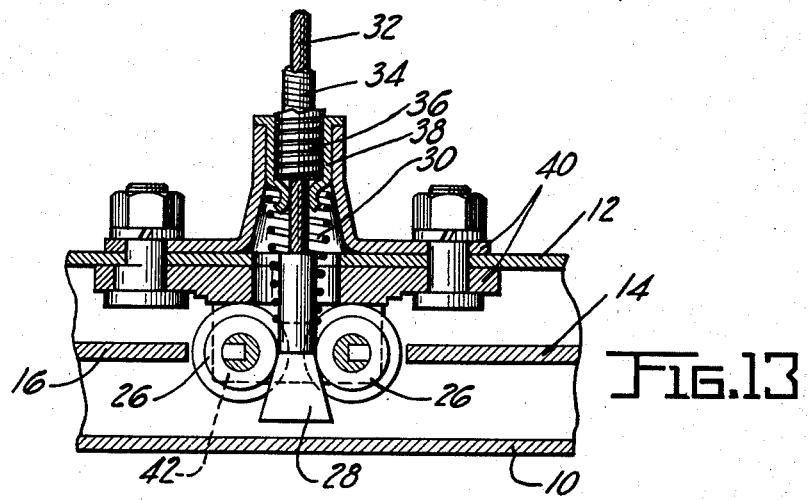
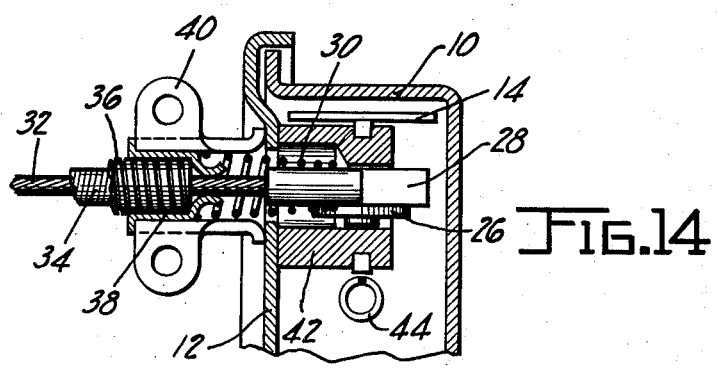

Patented Nov. 12, 1940

2,221,090

UNITED STATES PATENT OFFICE 2,221,090

BRAKE

Rudolph A. Goepfrich, South Bend, Ind., assignor to Bendix Products Corporation, South Bend, Ind., a corporation of Indiana Application April 4, 1938, Serial No. 199,750

15 Claims. (Cl. 188—79.5)

This invention relates to brakes, and is illustrated as embodied in an internal expanding brake for an automobile.

An object of the invention is to have the brake drum directly control the clearance of a brake having shoes which shift their anchorage to retain full effectiveness in both forward and reverse braking. Preferably the released positions of the shoes are determined by automatically adjusted stops, and the brake release springs swing the shoes in a manner to cause actuation of adjusting levers which re-set the adjustments for the shoes.

The invention is shown embodied in a brake having two shoes connected by an adjustable device operated by the described lever, and in a brake having individually anchoring shoes each of which has an adjustment associated therewith and operated by one of these adjusting levers. Various important features of novelty have to do with the means for operating the adjusting levers in brakes of these types.

Figure 6:
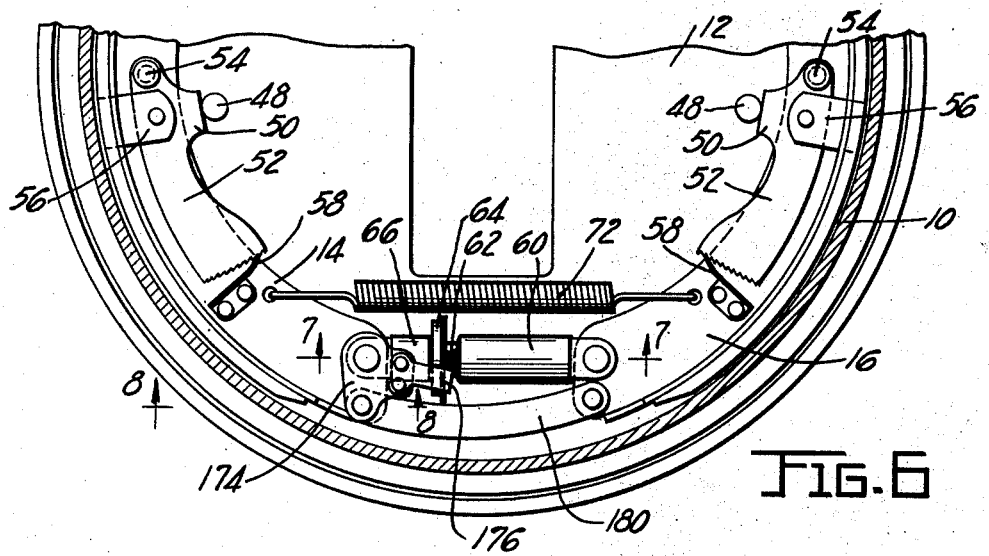
Figure 5:
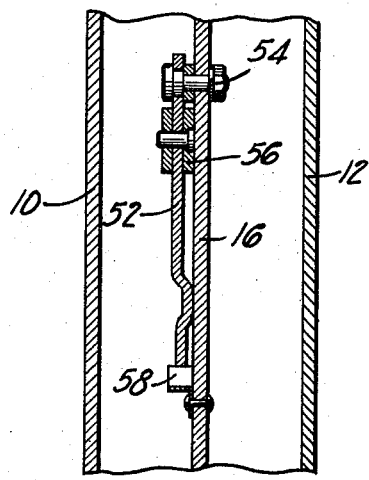
Figure 4:
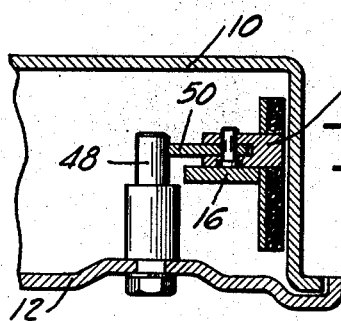
Figure 7:
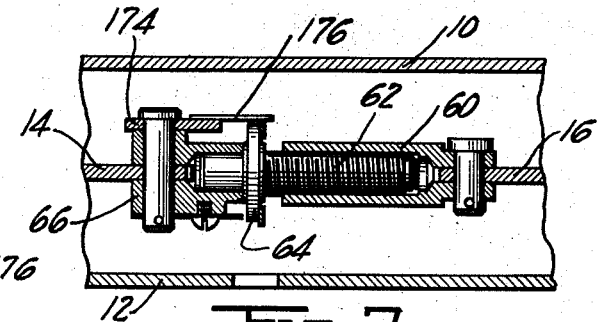
Figure 8:
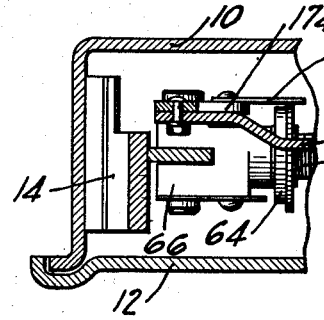
Figure 9:
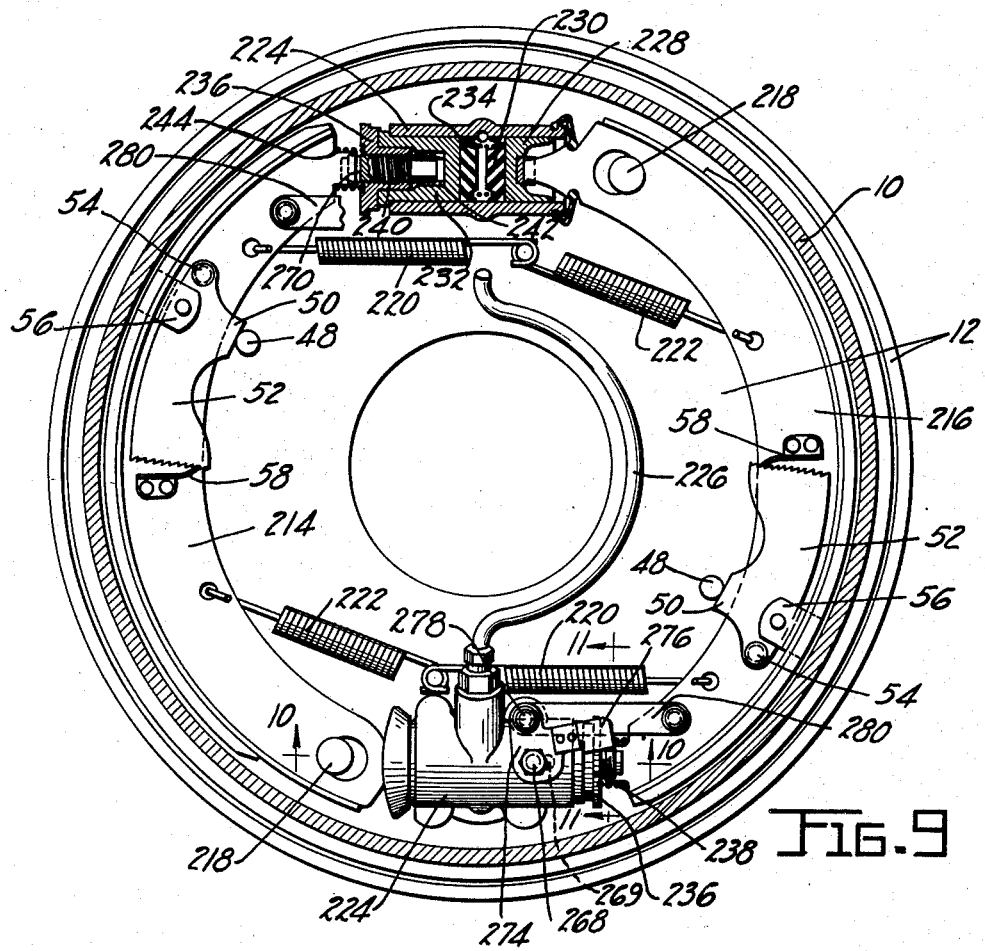
Figures 10, 11:
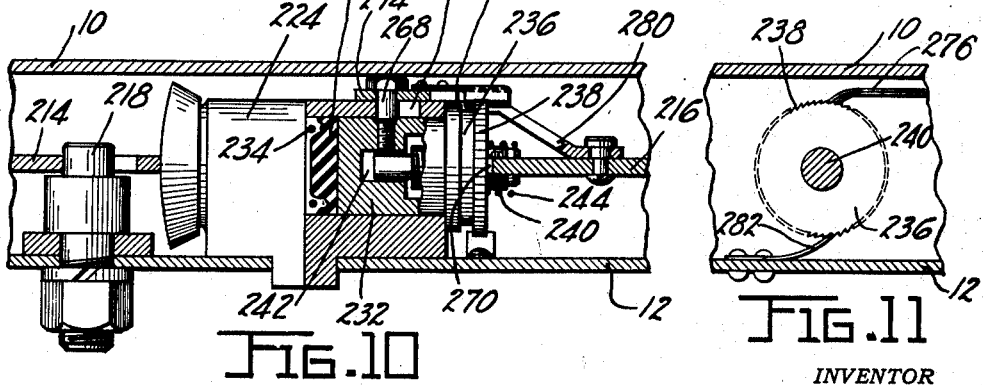

The above and other objects and features of the invention, including various novel combinations and desirable particular constructions, will be apparent from the following description of the illustrative brakes shown in the accompanying drawings, in which:

Figure 1 is a vertical section through a brake having connected shoes, in a plane just inside the head of the brake drum, and showing the shoes in side elevation;

Figures 2, 3, 4 and 5 are partial sections on the lines 2—2, 3—3, 4—4, and 5—5 respectively of Figure 1;

Figure 6 is a partial section, corresponding to the lower part of Figure 1, of a different brake having another means for operating the adjusting lever;

Figures 7 and 8 are partial sections on the lines 7—7 and 8—8 of Figure 6;

Figure 9 is a section corresponding to Figure 1, but showing a brake having individually-anchoring shoes;

Figures 10 and 11 are partial sections on the lines 10—10 and 11—11 of Figure 9;

Figure 12 is a partial section corresponding to the upper part of Figure 1, but showing a different brake-applying means; and Figures 13 and 14 are partial sections on the lines 13—13 and 14—14 of Figure 12.

The brake shown in Figures 1-5 includes a rotatable drum 10, at the open side of which is a support such as a backing plate 12, and within which is arranged the brake friction means, in this case a pair of shoes 14 and 16 faced with the usual brake lining. In this brake the anchorage of the shoes is on an anchor post 18 between the upper ends of the shoes.

The shoes may be applied, against the resistance of return springs 20 and 22 tensioned between the anchor and the shoes, by means such as a hydraulic actuator 24 which may be of standard construction.

If preferred, and as illustrated in Figures 12-14, the shoes may be mechanically actuated. In this arrangement the shoes carry at their ends rollers 26 engaging a wedge 28 operated (against the resistance of a spring 30) by a Bowden-type control comprising a flexible cable 32 housed in a flexible conduit 34. The control is shown provided with a suitable flexible metal cover 36. The cover and conduit seat against a fitting 38 seated in a two-piece bracket 40 bolted to the backing plate and formed with a central projecting horizontally-slotted portion 42 guiding the wedge 28 and serving as an anchor for the shoes 14 and 16, the ends of which are formed with circular notches pivotally to embrace a cylindrical seat formed on the exterior of the anchor portion. A single return spring 44 is shown in this arrangement.

The shoes may be positioned laterally by any suitable spring steady rests 46. Radially of the drum, the released positions of the shoes are determined by automatically adjusted stops including fixed pins 48 carried by the backing plate and engaged, when the brake is released, by projections 50 on levers 52 pivoted at 54 on the shoe webs. Secured to the levers 52 are plungers 56, of some material more wear-resistant than the brake lining facing the shoes, and which extend through openings in the rims of the shoes so as normally to be flush with the outer surface of the lining. The lower ends of the levers 52 are formed as arcuate racks, the teeth of which are engaged by spring pawls 58 mounted on the shoe webs, and so facing that while the levers may be swung away from the drum they cannot be moved accidentally in the other direction.

It will be seen that, in the case of wear of the lining beyond that corresponding to one rack tooth, when the brake is applied, the drum will act on the corresponding plunger 56 to force its lever away from the drum until its pawl 58 snaps over the next tooth, thus resetting the stop automatically. It is also important to note that, since the resetting is controlled by direct engagement with the drum, it is not affected by expansion of the drum due to heat generated in prolonged braking, and consequently does not have to be corrected when the drum cools off again.

The lower ends of the shoes are connected by an extensible coupling, shown as including a socket 60 pivoted to the end of shoe 16 and into which is threaded a stem 62 having a ratchet collar 64 by means of which it can be turned and which is rotatably seated in an unthreaded socket 66 connected to the web of shoe 14 by a pivot 68 passing through an elongated hole which is sufficiently over-size to allow a clearance 70 corresponding to one tooth of the ratchet 64. A spring 72, weaker than springs 20 and 22, is tensioned between the lower ends of the shoes.

A bellcrank lever 74, carrying a spring pawl 76 engaging the teeth of the ratchet 64, is pivotally mounted on the pivot 68, and moves with the pivot as the latter shifts in the slot 70. This lever is also directly connected with the shoe web by means of a pivot 78, and has attached to its inner end a spring 80 tensioned between the lever and the shoe web, and which acts in a direction to urge the pivot 68 to the right (Figure 2) in slot 70.

When the brake is released, the springs 20 and 22 hold the shoes against the anchorage 18, and the spring 72 holds the shoes against the stops 48. When the brake is applied, if the lining on one shoe has worn sufficiently its lever 52 is pushed inwardly until the pawl 58 engages the next tooth of the ratchet. When the brake is again released, the spring 20 or 22 pivots that shoe upon its stop 48, stretching the spring 72 and shifting the pivot 68 to the right (Figure 2) in the slot 70, leaving a clearance to the left of pivot 68. On the next brake application, the connection 60—66 is placed under compression, taking up this clearance by reason of the movement of pivot 78 relatively to pivot 68, stretching the spring 80 and moving the lever 74 clockwise far enough for the pawl 76 to engage the next tooth of the ratchet 64.

When the brake is again released, springs 20 and 22 again act to position the shoes as determined by anchorage 18 and stops 48—52, stretching the spring 72 as before, whereupon the spring 80 turns lever 74 counterclockwise until pivot 68 again engages the right-hand end of slot 70, thus turning the ratchet 64 one tooth, and spreading the shoes apart a corresponding amount.

Since the slot 70 prevents adjustment of more than one tooth of ratchet 64 at a time, and since these teeth cause such a fine adjustment that it takes quite a number of such adjustments to take up for a one-tooth movement of one of the levers 52, the above operation will be repeated a number of times on successive brake applications until the complete adjustment of the connection 60—66 is made. This repeated fine adjustment of the connection to compensate for a one-tooth adjustment of one of the stops insures accuracy of the entire adjustment.

The arrangement in Figures 6–8 differs from that described above in that lever 174, corresponding to lever 74, while it operates the adjustment substantially as described, is itself operated by a link 180 connecting its lower arm to the shoe 16. In this case, the spreading of the lower ends of the shoes, after a resetting of one of the levers 52, causes link 180 to rock the bellcrank lever 174 so that the spring pawl 176 picks up the next tooth of the ratchet 64.

Figures 9–11 show a brake in which there are two shoes 214 and 216 which act individually to anchor at one end or the other, according to the direction of rotation of the drum 10, so that they are always fully effective. These shoes have associated therewith automatically adjustable stop mechanisms 48—58 as described above; however, to increase the leverage of the return springs in operating the adjustments the latter are moved away from the ends of the shoes having fixed anchorages.

Each of the shoes has its web formed near one end with an elongated opening embracing a fixed anchor pin 218 carried by the backing plate. Each of the shoes has connected to its opposite ends return springs 220 and 222 which insure its return, when the brake is released, to an idle position determined by the anchor 218 and the stop pin 48.

Between the opposite ends of the shoes are a pair of hydraulic cylinders 224 connected by suitable conduits, one of which is shown at 226, with the usual master cylinder (not shown) on the vehicle. Each cylinder 224 contains a piston 228 faced with a rubber packing 230 and engaging the anchored end of one of the shoes, and with a second piston 232 flanged to seat in anchoring engagement with the opposite end of the cylinder, and similarly faced with a packing 230. The two packings 230 in each cylinder are urged apart, to push the pistons yieldingly toward the shoes and to hold the packings against the pistons, by a spring 234.

Each cylinder 232 is formed with a socket rotatably receiving the reduced diameter end of a nut 236, flanged to seat against the end of the piston and formed on its periphery with ratchet teeth 238, and which is threaded on an adjustment plunger 240 having one end flattened and extending into a correspondingly-shaped socket 242 in the piston, and having its other end slotted and arranged to embrace the unanchored end of the web of the shoe. A spring 244, heavier than spring 234, is arranged between the shoe end and the face of the nut 236, and when the brake is released insures a slight clearance 270 at the end of the shoe web.

A post 268, extending through a lost-motion slot 269 in the cylinder wall, is mounted on each piston 232, and is pivotally seated in an opening in a stamped lever 274 having a spring pawl 276 yieldingly engaging the ratchet teeth 238. The pawls 276 preferably consist of series of spring teeth separated by less than the distance between ratchet teeth 238. The levers 274 are connected by pivots 278 to links 280 at their inner ends, connecting the levers to the adjacent ends of the webs of the corresponding shoes. Pawls 282 mounted on the backing plate hold the ratchets 238 against retrograde movement.

In operation, if the brake is applied when the vehicle is moving in one direction, the shoes anchor through pistons 232 on the cylinders, and if it is applied when the vehicle is moving in the other direction they anchor on the anchor posts 218. If the lining is sufficiently worn, levers 52 shift and when the brake is released the ends of the shoes opposite the anchors 218 do not fully return to their former released positions.

The pistons 232, however, are returned to anchored position by the springs 244 and due to the clearance 270 act to swing levers 274 about their connections with links 280 as fulcrums and if there has been a readjustment of levers 52 they cause the nuts 236 to shift the plungers 240 to make the desired adjustment. Each time the brake is released, due to the clearances 270, the levers 274 rock to swing pawls 276, but only after a readjustment of levers 52 do pawls 276 swing far enough to pick up the next ones of teeth 238. When they do swing so far, and engage the next teeth 238, at the time the brake is applied, when the brake is released again springs 220 swing the lever 274 in a direction to turn the nuts 236 to adjust the plungers 240 to compensate for the new positions of the levers 52.

While several illustrative embodiments have been described in detail, it is not my intention to limit the scope of the invention to those particular embodiments, or otherwise than by the terms of the appended claims.

I claim:

1. A brake comprising a drum, a friction device anchoring differently in opposite directions of drum rotation to be effective for substantially its full length, an adjustable stop device for determining the released position of the friction device, spring means for returning the friction device to a released position determined by the stop device, and means for changing the effective length of the friction device to compensate for different adjustments of the stop device and including a member rotatable relatively to the friction device to change its effective length and which is provided with a ratchet in combination with a lever which has a pawl operatively engaging said ratchet to turn said member when the lever is so oscillated, said length-changing means having parts arranged to rock said lever during the operation of applying and releasing the brake to cause the pawl to turn the ratchet to compensate for wear of the friction device.

2. A brake comprising a drum, a friction device anchoring differently in opposite directions of drum rotation to be effective for substantially its full length, an adjustable stop device for determining the released position of the friction device, spring means for returning the friction device to a released position determined by the stop device, and means for changing the effective length of the friction device to compensate for different adjustments of the stop device and including a member rotatable relatively to the friction device to change its effective length and which is provided with a ratchet in combination with a lever, said length-changing means having parts operated after wear of the friction device to rock said lever automatically by release movement of the friction device after an applying movement beyond a normal applying movement and which has a pawl operatively engaging said ratchet to turn said member when the lever is so oscillated, the friction device comprising a pair of shoes and the length-changing means forming an extensible connection between said shoes.

3. A brake comprising a drum, a friction device anchoring differently in opposite directions of drum rotation to be effective for substantially its full length, an adjustable stop device for determining the released position of the friction device, spring means for returning the friction device to a released position determined by the stop device, and means for changing the effective length of the friction device to compensate for different adjustments of the stop device and including a member rotatable relatively to the friction device to change its effective length and which member is provided with a ratchet in combination with a lever oscillated automatically by release movement of the friction device after an applying movement beyond a normal applying movement and which has a pawl operatively engaging said ratchet to turn said member when the lever is so oscillated, the friction device comprising a shoe having an anchorage adjacent each end and one of which takes the braking torque of the shoe in one direction of drum rotation and the other of which takes the braking torque of the shoe in the opposite direction of drum rotation.

4. A brake comprising a drum, a friction device anchoring differently in opposite directions of drum rotation to be effective for substantially its full length, an adjustable stop device for determining the released position of the friction device, spring means for returning the friction device to a released position determined by the stop device, and means for changing the effective length of the friction device to compensate for different adjustments of the stop device and including a member rotatable relatively to the friction device to change its effective length and which member is provided with a ratchet in combination with a lever oscillated automatically by release movement of the friction device after an applying movement beyond a normal applying movement and which has a pawl operatively engaging said ratchet to turn said member when the lever is so oscillated, the friction device comprising a floating shoe having anchorages at both ends and applying means acting on both ends.

5. A brake comprising a drum, a friction device anchoring differently in opposite directions of drum rotation to be effective for substantially its full length, an adjustable stop device for determining the released position of the friction device, spring means for returning the friction device to a released position determined by the stop device, and means for changing the effective length of the friction device to compensate for different adjustments of the stop device and including a member rotatable relatively to the friction device to change its effective length and which member is provided with a ratchet in combination with a lever oscillated automatically by release movement of the friction device after an applying movement beyond a normal applying movement and which has a pawl operatively engaging said ratchet to turn said member when the lever is so oscillated, the friction device comprising a floating shoe having anchorages at both ends and applying means acting on both ends, and the length-changing means forming an extensible connection between one end of the shoe and one anchorage and applying device.

6. A brake comprising a drum, a friction device anchoring differently in opposite directions of drum rotation to be effective for substantially its full length, an adjustable stop device for determining the released position of the friction device, spring means for returning the friction device to a released position determined by the stop device, and means for changing the effective length of the friction device to compensate for different adjustments of the stop device and including a member rotatable relatively to the friction device to change its effective length and which member is provided with a ratchet in combination with a lever oscillated automatically by release movement of the friction device after an applying movement beyond a normal applying movement and which has a pawl operatively engaging said ratchet to turn said member when the lever is so oscillated, the friction device comprising a floating shoe having anchorages at both ends and applying means acting on both ends, the anchorages being fixed hydraulic cylinders containing pistons forming applying means and acting on the ends of the shoe.

7. A brake comprising a drum, a pair of floating shoes shiftable individually lengthwise and arranged to anchor individually at their opposite ends in opposite directions of drum rotation to be effective for substantially their full lengths, an adjustable stop device for determining the released position of each of the shoes, spring means for returning the shoes to released positions determined by the stop devices, means associated with one end of each shoe for changing its effective length to compensate for different adjustments of the stop device, and means operated automatically by applying and releasing the brake to adjust each of the length-changing means to compensate for each adjustment of the corresponding stop device.

8. A brake comprising a drum, a pair of floating shoes shiftable individually lengthwise and arranged to anchor individually at their opposite ends in opposite directions of drum rotation to be effective for substantially their full lengths, an adjustable stop device for determining the released position of each of the shoes, spring means for returning the shoes to released positions determined by the stop devices, means associated with one end of each shoe for changing its effective length to compensate for different adjustments of the stop device, and means operated automatically by applying and releasing the brake to adjust each of the length-changing means to compensate for each adjustment of the corresponding stop device, each stop device including a part carried by the corresponding shoe and shifted crosswise of the shoe by engagement with the drum in case of wear of that shoe.

9. A brake comprising a drum, a plurality of shoes having anchorage means at their opposite ends and individually shiftable to anchor at their opposite ends in opposite directions of drum rotation, a device for each shoe set by engagement with the drum in case of wear of that shoe and adjustably determining the released position of that shoe, and means for automatically adjusting the anchorage means of each shoe at one end thereof after each adjustment of the corresponding one of said devices.

10. A brake comprising a pair of shoes, fixed hydraulic cylinders between opposite ends of the shoes, a pair of pistons in each cylinder, one of which acts directly on one shoe and the other of which acts on the other shoe through an adjustable connection, an automatically adjusted stop for determining the released position of each shoe, and means for adjusting the corresponding one of said connections after each adjustment of one of said stops.

11. A brake comprising a pair of shoes, fixed hydraulic cylinders between opposite ends of the shoes, a pair of pistons in each cylinder one of which acts directly on one shoe and the other of which acts on the other shoe through an adjustable connection, an automatically adjusted stop for determining the released position of each shoe, and means for adjusting the corresponding one of said connections after each adjustment of one of said stops, each of said stops including a fixed member and a member engageable therewith in released position and movably carried by the shoe and adjusted after wear of the shoe by direct engagement with the brake drum.

12. A brake comprising a shoe, stop mechanism determining the released position of said shoe, a hydraulic cylinder adjacent said shoe, a piston in said cylinder, a thrust connection between the piston and shoe, means for adjusting the effective length of said connection, a lever mounted on said piston and arranged to operate said means, and a link connecting said lever and the shoe and arranged to rock said lever to operate said adjusting means when the shoe moves away from and back toward the piston.

13. A brake comprising a shoe, stop mechanism determining the released position of said shoe, a hydraulic cylinder adjacent said shoe, a piston in said cylinder, a thrust connection between the piston and shoe, means for adjusting the effective length of said connection, a lever arranged to operate said means, and means connecting said lever and the shoe and arranged to rock said lever to operate said adjusting means when the shoe moves away from and back toward the piston.

14. A brake comprising a shoe, a hydraulic cylinder adjacent said shoe, a piston in said cylinder, a thrust connection between the piston and shoe, means for adjusting the effective length of said connection, a lever arranged to operate said means, and means connecting said lever and the shoe and arranged to rock said lever to operate said adjusting means when the shoe moves away from the piston, in combination with an anchorage for the end of the shoe opposite said cylinder, an adjustable stop device for a part of the shoe between the anchorage and said cylinder, and yielding means for rocking the shoe about the stop device against the anchorage and thereby in case of adjustment of the stop device for wear tending to separate the shoe from the piston to cause operation of the adjusting means.

15. A brake comprising a pair of shoes having anchorages for their adjacent ends and adjustable stop devices acting on the shoes between their ends and yielding means acting when the brake is released to rock the shoes about the stop devices against the anchorages, in combination with a connection for the ends of the shoes opposite the anchorages including an extensible connecting device, a lever mounted on one shoe and arranged to operate the connecting device, and means connecting the lever and the other shoe and which is operated by separating movement of the connected shoe ends to rock the lever.

RUDOLPH A. GOEPFRICH.